United States Patent [19]
Lyall

[11] Patent Number: 5,913,335
[45] Date of Patent: Jun. 22, 1999

[54] FLUID FOR DISCHARGING STATIC ELECTRICITY ON THE SURFACES OF PLASTIC PIPE AND METHOD FOR USING SAME

[75] Inventor: Lucian H. Lyall, Anaheim Hills, Calif.

[73] Assignee: Gas Research Institute, Chicago, Ill.

[21] Appl. No.: 08/960,530

[22] Filed: Oct. 31, 1997

[51] Int. Cl.⁶ ........................................ F16L 55/18
[52] U.S. Cl. ............................................ 138/97; 138/99
[58] Field of Search ................................. 138/97, 99

[56] References Cited

U.S. PATENT DOCUMENTS

| | | |
|---|---|---|
| 3,635,797 | 1/1972 | Battistoni et al. . |
| 4,152,288 | 5/1979 | Friedman, Jr. et al. . |
| 4,170,248 | 10/1979 | Bennett et al. ........................ 138/97 |
| 4,224,655 | 9/1980 | Loncaric . |
| 4,335,752 | 6/1982 | Sumner ...................................... 138/97 |
| 4,552,183 | 11/1985 | Chick ......................................... 138/97 |
| 4,555,053 | 11/1985 | Persson et al. ........................... 138/97 |
| 4,619,555 | 10/1986 | Skinner et al. ........................... 138/97 |
| 5,173,333 | 12/1992 | Tranbarger et al. . |
| 5,759,984 | 6/1998 | Shetty et al. ............................. 510/392 |

OTHER PUBLICATIONS

Genencor International Brochure, "Multifect P–3000 Enzyme", Jan. 1995.

*Primary Examiner*—Denise L. Ferensic
*Assistant Examiner*—James F. Hook
*Attorney, Agent, or Firm*—Factor and Shaftal, LLC

[57] ABSTRACT

A fluid for dissipating static electrical charge from the surface of a plastic object, such as a polyethylene pipe, and a method for using same, are provided. The solution comprises water, an anti-freezing agent and a static-dissipating enzyme.

9 Claims, 1 Drawing Sheet

FLUID FOR DISCHARGING STATIC ELECTRICITY ON THE SURFACES OF PLASTIC PIPE AND METHOD FOR USING SAME

THE PRIOR ART

1. The Technical Field of the Invention

The invention relates in general to a fluid and method for discharging electrostatic charges present on the surfaces of plastic pipe, and particularly to a fluid and method for discharging the surfaces of polyethylene pipe.

2. The Prior Art

The electrostatic charge build up on the surfaces of plastic pipe, and in particular, polyethylene pipe, is a hazardous problem when attempting to repair hydrocarbon gas pipelines, because of potential spark discharges that may occur. It has been found that the buildup of charge can cause electrical shock to personnel that come into contact with a charged pipeline surface and can trigger a fire and explosion when discharged.

It is common for a charge to be generated by triboelectrification (frictional charging). Charge can be stored on the surface of polyethylene pipe because of the inherent high resistivity of the polyethylene pipe. Particles, such as dust and rust, in the gas produce charge at the interior wall of the plastic pipe because of the triboelectrification. Triboelectrification can generate either a positive or a negative charge in a plastic pipe. It has also been observed that charge present inside these pipes induces charge buildup on the outside surface of the pipe.

Because of the presence of these charges, an electrical spark discharge can occur from metal objects or be experienced by personnel near the pipe when attempting to repair the pipe. Technology and procedures have been developed to discharge both the interior and the exterior surfaces of polyethylene pipe. For example, in a report entitled "Control of Static Hazard in Plastic Pipe" which was prepared by Battelle (Columbus Laboratories), it was determined that water sprays were effective for discharging charge on the interior wall of pipes but required access to the interior of the pipe. It was found that water on polyethylene pipe surfaces does not form a continuous wet film. Unfortunately, if the film coating of the fluid is not continuous, complete discharge of the interior surface of the pipe is not effective.

In addition, the above report discloses the use of x-rays as an effective method for discharging static charges on both the interior and exterior walls of pipe. Unfortunately, the use of x-rays is not practical for field applications. Further, x-ray equipment is cumbersome, expensive and potentially hazardous to operators. Prior technology has further considered the use of an environmentally safe anti-static fluid in polyethylene pipe by penetrating the pipe and spraying the anti-static fluid to discharge the surface. However, such invasive approaches to removing static discharge have been found to be unsuitable, in that the amount of time required to appropriately pierce the pipe and insert the spraying equipment involves a leakage of sufficient gas that a potentially hazardous situation is developed before any satisfactory amounts of anti-static fluid can be applied, thus creating a potentially greater hazard of fire or explosion than the original leak from the pipe itself may cause.

Another problem which exists is the use of an anti-static fluid which does not degrade the integrity of polyethylene pipe. Since polyethylene pipe is a polymer, many common fluids tend to degrade the integrity of the pipe. In addition, since the antistatic fluid may enter the gas stream, it is imperative that the anti-static fluid not create problems in gas processing facilities, such as the creation of hydrates or the reduction of the heating value of the gas. In addition, it is desirable to have an antistatic fluid that is environmentally safe.

A need has therefore arisen for fluid for discharging the surfaces of polyethylene pipe and a method for applying same which avoids the prior potential difficulties with anti-static fluids and prior methods for applying same and which is cost effective for use in remote areas, biodegradable and user and environmentally benign.

SUMMARY OF THE INVENTION

The present invention is directed, in part, to an anti-static solution for discharging static electrical charges from the surface of an object, such as a polyethylene pipe.

The solution is a mixture of:

34%–54%, by volume, water;

40%–60%, by volume, propylene glycol; and

6%, by volume, enzyme.

Preferably, the solution has the following composition:

54%, by volume, filtered water;

40%, by volume, propylene glycol; and

6%, by volume, enzyme.

The enzyme component may be one of the following: optimase enzyme, serine endopeptidase enzyme.

In addition, the present invention is directed, in part, to a method for repairing a breach in a plastic pipe buried in soil, comprising the steps of:

locating approximately the position of the breach in the buried plastic pipe;

excavating above the approximate position of the breach;

continuing to excavate until the pipe has been exposed;

spraying the pipe with the anti-static solution;

clamping the pipe at positions upstream and downstream from the breach;

severing the pipe at positions upstream and downstream from the breach, between the clamping positions;

removing the severed section of pipe;

inserting a replacement section of pipe in the position vacated by the severed section of pipe;

fusing the replacement section of pipe to the severed pipe ends in the excavation.

After the fusion of the replacement section has been completed, the spraying of anti-static solution, if it has been continued through the repair procedure, is stopped. Then, the outer surface of the pipe is cleaned of anti-static solution.

During the static dissipation of the pipe, the pipe may be wrapped, in the vicinity of the breach, with static-conducting tape. The ends of the static-conducting tape may be grounded in the soil surrounding the pipe. The pipe may then be re-buried.

BEST MODE FOR CARRYING OUT THE INVENTION

Figure 1:
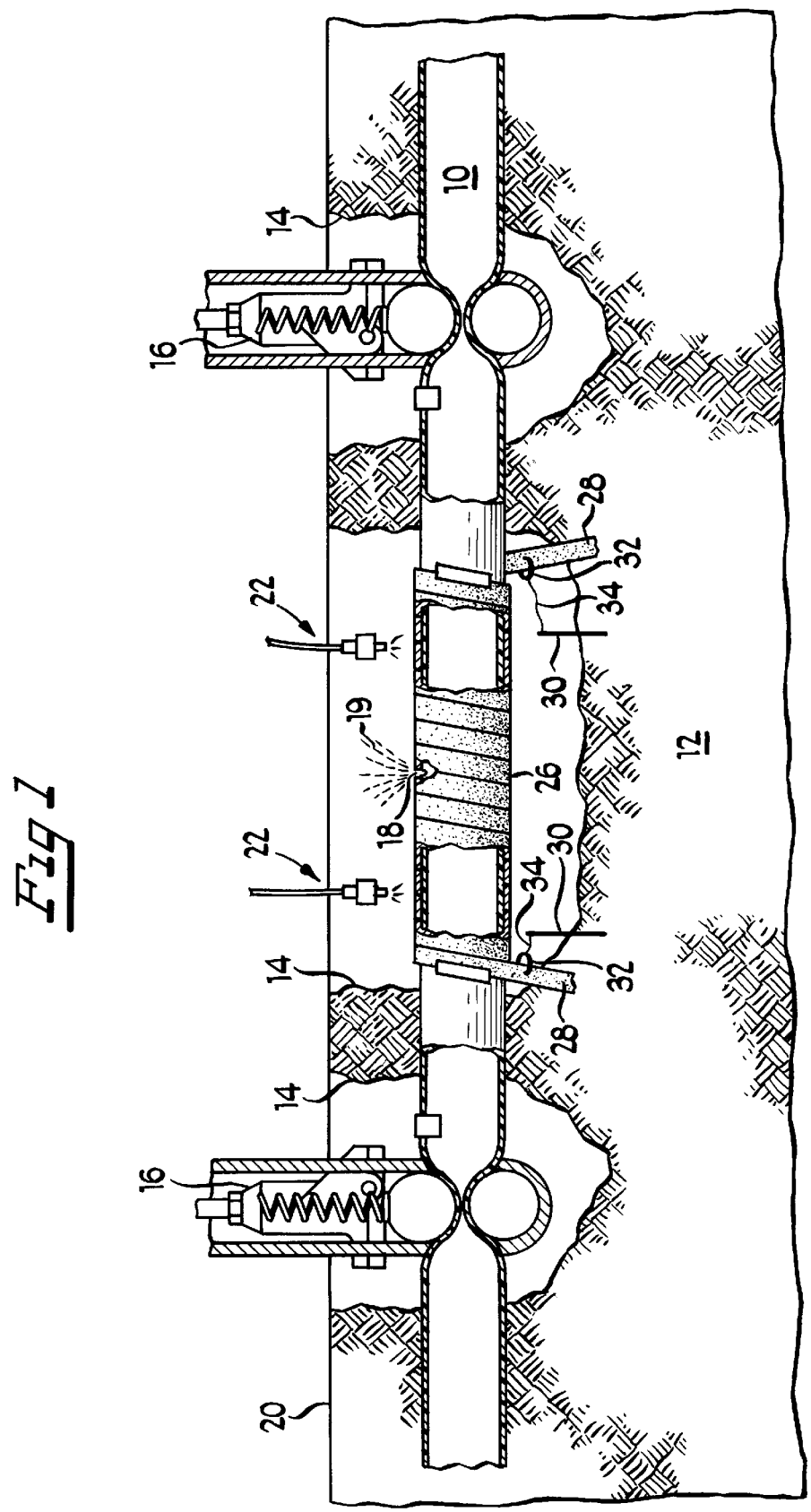
FIG. 1 is an illustration of the process for applying the anti-static fluid of the present invention to a damaged gas pipe.

While this invention is susceptible of embodiment in many different forms, there is shown in the drawings and will be described in detail herein, a specific embodiment, with the understanding that the present invention is to be considered as an exemplification of the of the principles of the invention and is not intended to limit the invention to the embodiments illustrated.

FIG. 1 depicts a typical gas pipeline repair situation. In a preferred embodiment, plastic pipe 10 is a polyethylene pipe. Generally, pipe 10 transports a hydrocarbon gas and is buried in soil 12. When pipe 10 is damaged, bell holes 14 are dug to expose pipe 10 to the atmosphere. Prior to repairing pipe 10, clamps 16 (which may be conventional pipe clamps used for repairing plastic pipe) are connected to pipe 10 to isolate the damaged area.

Once a leak 18 has located in pipe 10, it is necessary to replace a portion of pipe 10 and eliminate any gas discharge. Leak 18 can be made several ways, such as an accidental puncture with a backhoe or other mechanical equipment. Leak 18 permits a gas source 19 to seep from its passageway and create a possible hazardous situation. Because charge is generated by triboelectrification (frictional charging), the surface of pipe 10 must be discharged to eliminate any potential fire or explosion.

Typically, the approximate depth of the pipe 10 below the surface 20 of soil 12 is known. As soon as the pipe has been exposed, but prior to contacting the pipe, the anti-static fluid of the present invention is sprayed onto the pipe and the soil surrounding the pipe, in the bell hole. The anti-static fluid is sprayed with sprayers 22 in sufficient quantities to soak into the soil and preferably make contact with and spread over the outer surface of pipe 10. Hand sprayers may be employed, or powered sprayers, as shown in FIG. 1. In this way, discharging of any static charge present on the outer surface 24 of pipe 10 will have begun to dissipate before pipe 10 and, in particular, leak 18, are contacted which could prompt a static discharge, which could result in fire or explosion. After spraying, soil sticking to the pipe is wiped off, and the pipe is resprayed to thoroughly wet the surface of the pipe.

Preferably, an anti-static wrapping 26 may also be placed around the pipe in the vicinity of the leak, with the ends 28 of the wrapping being inserted into the soil, in order to promote discharge of static into the soil. Static conducting rods 30 having clips 32 and connecting wires 34, such as are known in the art, may be clipped to the ends 28 of the wrapping and embedded into the soil as well. Typically, such rods may be fabricated from copper. The rods 30, clips 32 and wires 34 may also be temporarily clipped to such metal tools as may be used in the repair procedure, with rods 30 stuck into the soil, to dissipate static from the tools. The tools may also be sprayed with the anti-static fluid.

The anti-static fluid spraying may be continued periodically throughout the repair procedure and until the pipe has been completely repaired and the leak completely closed.

If the pipe has been wrapped with tape 26, the tape preferably will be removed from the immediate vicinity of the leak 18, and the area thoroughly washed and dried, prior to the actual repair procedure. Washing of the pipe may be done preferably with water, using two separate rinsing steps, as well as wiping the area, to remove as much of the anti-static fluid from the immediate area of the leak as possible. If the repair procedure is being performed in freezing conditions, isopropyl alcohol may be mixed with the water in a 1:4 ratio of alcohol to water.

The methods and equipment employed in the actual excising of the damaged section of the pipe and replacement and patching of the replacement pipe section are accomplished in accordance with conventional pipe repairing techniques and are accordingly not described herein in detail.

The composition of the anti-static fluid in accordance with the principles of the present invention comprises a mixture of the following components in the following proportions:

34% to 54%, preferably 54%, by volume, water;

40% to 60%, preferably 40%, by volume, propylene glycol (industrial grade); and

6%, by volume, optimase enzyme (previously sold under the brand name APL-440 by the Solvay Corporation); or 6%, by volume, serine endopeptidase enzyme (sold under the brand name Multifect P-3000 by Genencor International).

The water may be common tap water. However, tap water typically contains chlorine in varying amounts, as well as bacteria and particulate materials, which may shorten the shelf life of the solution—although the short term efficacy of the solution should not be affected. Accordingly, the water preferably will be filtered to seek to remove, or at least reduce the amount of, any chlorine, bacteria and/or particulates which may be present in the water. The degree of filtration which is employed may be selected by the practitioner according to such factors as cost and/or time which may be added to the manufacturing process, the desired amount of shelf life being sought, and so on. Common commercially available add-on filters, such as are screwed onto the open end of a household water faucet, may be used to provide an adequate degree of filtration.

Preparation of the mixture does not require any other special conditions or equipment, and may be performed at indoor ambient temperatures.

Prior art anti-static fluid compositions, such as that disclosed by Battistoni et al., U.S. Pat. No. 3,635,797, or Tranbarger et al., U.S. Pat. No. 5,173,333, either contained no component which would lower the freezing point of the solution, so that it could be used in winter or northern applications, or contained components which would structurally degrade the polyethylene from which substantially all gas transport pipes are and have been manufactured. For example, the Tranbarger et al. '333 reference discloses the use of a de-icer material containing alkali metal, acetate salt and corrosion inhibitors, which has been found to have an adverse effect upon polyethylene pipe, promoting cracking. Other prior art solutions have used solutions based upon the Battistoni et al. reference, in combination with a potassium acetate solution, which likewise has been found to promote the degradation of polyethylene pipe. These prior art solutions have also been found to occasionally have an adverse effect upon the actual fusion of the new pipe section into the existing pipe.

Although some prior art solutions have contained glycols, such as Battistoni et al. '797, the amount of glycol in such solutions was relatively small (less than approximately 15% of the enzyme composition) and was contemplated solely as a surfactant. The Tranbarger et al. reference even teaches against the use of glycols as an anti-freezing agent. In addition, none of the glycols discussed in Battistoni et al. '797 or in Tranbarger et al., U.S. Pat. No. 5,173,333 include propylene glycol, which is substantially non-toxic, nondestructive of pipes and effective as an anti-freezing agent, when used in the quantities indicated herein.

The enzyme formulations used in the solution of the present invention are non-toxic, environmentally safe, effective in wetting the pipe surface and dissipating electrical charge, non-destructive of the pipe, and highly economic. In addition, the enzyme can be highly diluted, while still maintaining the foregoing desired characteristics.

After the pipe has been repaired, and prior to recovering the pipe with soil, the pipe should be cleaned of the anti-static fluid. As previously described, two successive washes with plain water can effectively remove the anti-static fluid, if the repair is being performed in above-freezing ambient conditions. A solution of hydrogen peroxide can also be used as a cleaning agent. As previously described, alcohol may be mixed with the water, for rinsing in freezing conditions.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

I claim:

1. An anti-static solution for discharging static electrical charges from the surface of an object, such as a polyethylene pipe, comprising:

34%–54%, by volume, water;

40%–60%, by volume, propylene glycol; and

6%, by volume, enzyme wherein the solution is capable of discharging static electrical charges.

2. The anti-static solution according to claim 1, wherein the enzyme comprises at least one of the following: optimase enzyme, serine endopeptidase enzyme.

3. The anti-static solution according to claim 1, wherein the solution comprises:

54%, by volume, water;

40%, by volume, propylene glycol; and

6%, by volume, enzyme.

4. A method for repairing a breach in a plastic pipe buried in soil, comprising the steps of:

locating approximately the position of the breach in the buried plastic pipe;

excavating above the approximate position of the breach;

continuing to excavate until the pipe has been exposed;

spraying the pipe with an anti-static solution of

34%–54%, by volume, water;

40%–60%, by volume, propylene glycol; and

6%, by volume, enzyme, to dissipate static electrical charge which may be built up on the pipe and/or its vicinity;

clamping the pipe at positions upstream and downstream from the breach;

severing the pipe at positions upstream and downstream from the breach, between the clamping positions;

removing the severed section of pipe;

inserting a replacement section of pipe in the position vacated by the severed section of pipe;

fusing the replacement section of pipe to the severed pipe ends in the excavation.

5. The process according to claim 4, wherein the solution comprises:

54%, by volume, water;

40%, by volume, propylene glycol; and

6%, by volume, enzyme.

6. The process according to claim 4, further comprising the step of:

wrapping the pipe, in the vicinity of the breach, with static-conducting tape; and grounding the ends of the static-conducting tape in the soil surrounding the pipe.

7. The process according to claim 4, further comprising the steps of:

halting the spraying of the anti-static solution;

cleaning the outer surface of the pipe of anti-static solution.

8. The process according to claim 7, further comprising the steps of:

covering the repaired pipe with soil.

9. An apparatus for discharging static electrical charges from the surface of an object, such as a polyethylene pipe, comprising:

an anti-static solution including:

34%–54%, by volume, water;

40%–60%, by volume, propylene glycol; and

6%, by volume, enzyme; and means for applying the anti-static solution to the surface of an object, such as a polyethylene pipe, to, in turn, dissipate static electrical charges therefrom.

* * * * *